Figure 1:
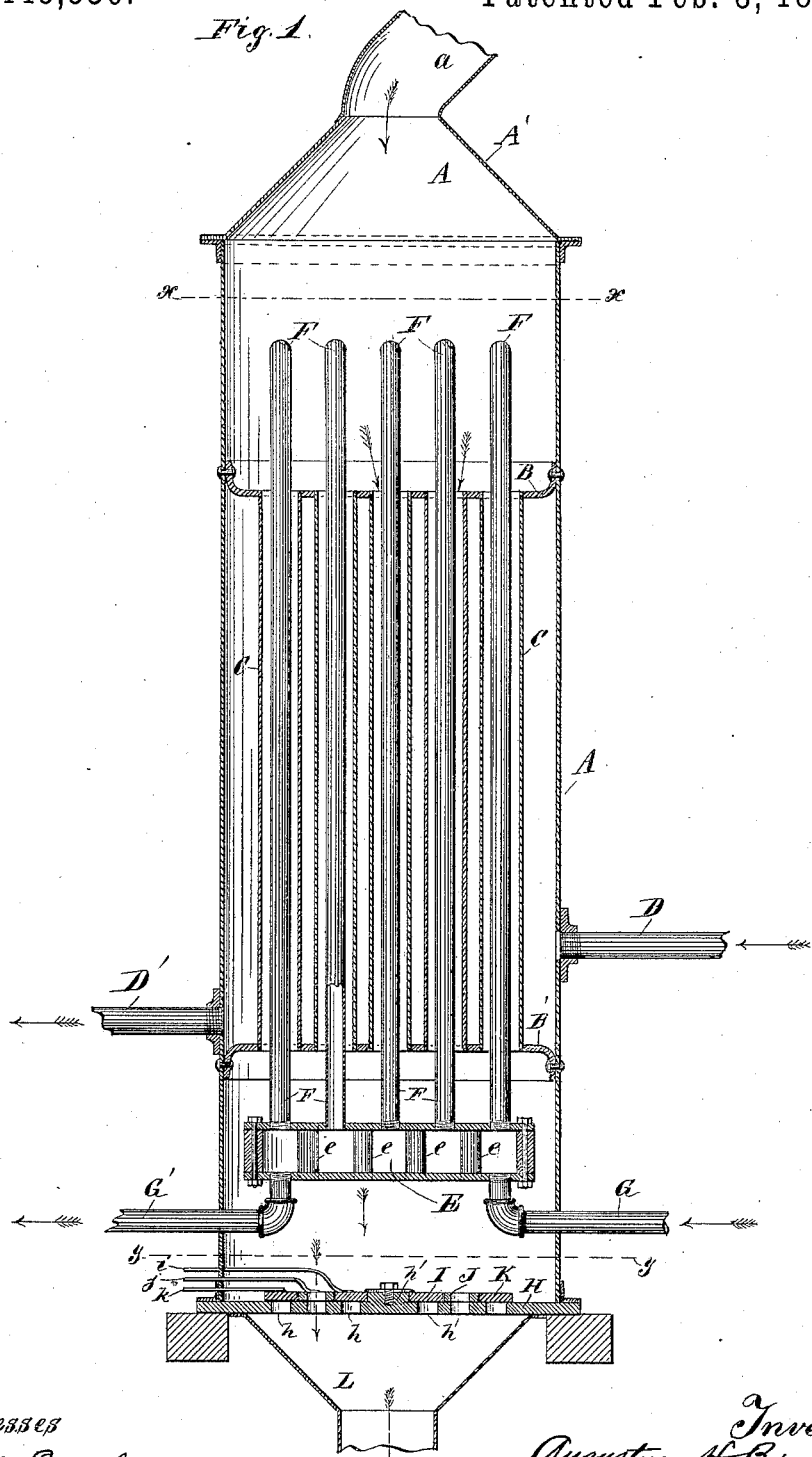

(No Model.) 2 Sheets—Sheet 2.

A. H. BROCKMAN.
WHEAT HEATER.

No. 445,536. Patented Feb. 3, 1891.

Witnesses.
A. H. Opsahl.
Frank D. Merchant

Inventor
Augustus H. Brockman
By his Attorneys.
Williamson & Blodgett

UNITED STATES PATENT OFFICE.

AUGUSTUS H. BROCKMAN, OF MINNEAPOLIS, MINNESOTA.

WHEAT-HEATER.

SPECIFICATION forming part of Letters Patent No. 445,536, dated February 3, 1891.

Application filed March 7, 1890. Serial No. 342,956. (No model.)

*To all whom it may concern:*

Be it known that I, AUGUSTUS H. BROCKMAN, a citizen of the United States, residing at Minneapolis, in the county of Hennepin and State of Minnesota, have invented certain new and useful Improvements in Wheat-Heaters; and I do hereby declare the following to be a full, clear, and exact description of the invention, such as will enable others skilled in the art to which it appertains to make and use the same.

My invention relates to an apparatus for heating wheat, and has for its object the production of a device for accomplishing this work in a reliable and satisfactory manner.

In all flouring-mills containing modern machinery devices for heating moistened wheat before it is subjected to the action of the rollers are in use, but they are of inferior construction and fail satisfactorily to perform the work required. In some of these devices the wheat is delivered at the top of a chamber heated by a spiral steam-coil extending longitudinally thereof, while in others the chamber is surrounded by a steam-jacket and contains a steam-heated drum over which the wheat falls in a shower. The trouble with these devices has been that they fail to heat the wheat evenly, and some of it will pass through in a cold state.

In my invention I provide an upright chamber having a top of conical or other suitable shape, to which a wheat-delivery pipe is connected, this chamber being heated by steam introduced by an inlet-pipe in communication with one side thereof. Within the chamber are flanged partitions riveted to the sides thereof and spaced apart by tubes. Below the lower partition is a steam chamber or manifold having a series of long pipes extending upward through the tubes connecting the partitions, the upper closed ends of these pipes extending above the top partition for the purpose of heating the top of the chamber, and their lower open ends being in communication with the manifold. This manifold is composed of two plates spaced the proper distance apart and contains a series of short tubes with open ends. Suitable steam inlet and exhaust pipes are in communication with this manifold. At the bottom of the main chamber is a plate with a series of concentric rows of holes or perforations, (three rows are shown,) which is provided with a central pivot or hub. On this hub is mounted an annulus having a series of perforations corresponding to the inner row of holes in the bottom plate. Surrounding this annulus is another annular plate provided with a series of holes corresponding to the second concentric row of perforations in the bottom plate, and surrounding the second annular plate is another annulus provided with holes corresponding to the third circular row of holes in the bottom plate. Each of these annular plates is provided with an operating-handle passing outward through slots in the wall of the main chamber. By the employment of these annular plates the discharge of the wheat from the heating-chamber can be regulated with great nicety, and it is also possible to ascertain whether or not all parts of the contents of the device are heated, so that all danger of the passage of cold wheat is avoided. If all the holes in the regulating-plates are in registration with those of the bottom plate, the wheat will pass rapidly through the apparatus into the delivery-spout; but if it is found that the discharge is so rapid that cold wheat is passing through, one or all of the regulating-plates can be turned to shut off the discharge, either partially or wholly, and thereby cause the wheat to be retained in the heating-chamber for a longer time.

Figure 2:
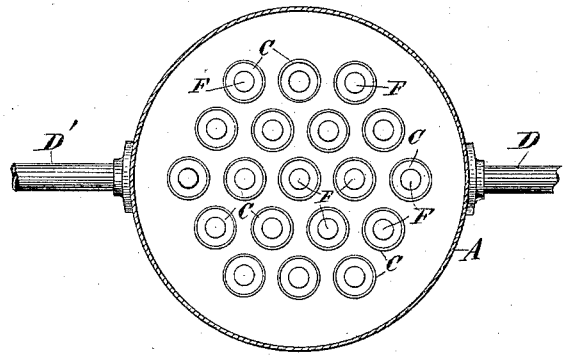
Figure 3:
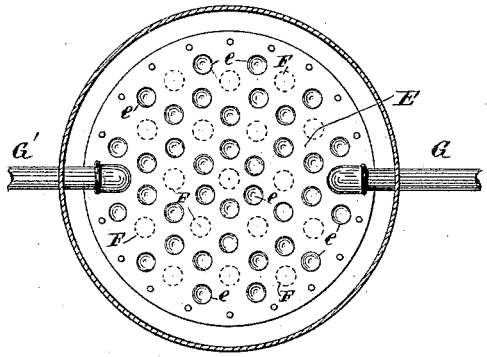
Figure 4:
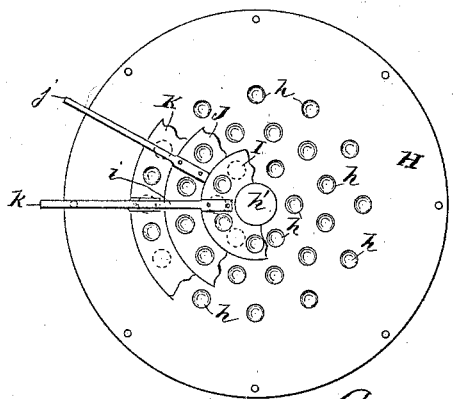

In the accompanying drawings, in which like symbols of reference are placed on like parts throughout the several views, Figure 1 is a vertical longitudinal section of the apparatus. Fig. 2 is a section on line $xx$ of Fig. 1. Fig. 3 is a section on line $y\,y$, Fig. 1, looking upward. Fig. 4 is a plan view of the regulating-plates at the bottom of the heating-chamber.

A is a vertical heating-chamber composed, preferably, of boiler-iron and having a suitable cap or cover A' (shown as of conical shape) in communication with the wheat-delivery pipe $a$.

B B' are flanged partitions within the chamber and riveted to the walls thereof.

C C are tubes connecting these partitions. The space between the partitions constitutes a steam-chamber, which is supplied with steam by a pipe D, leading from a suitable generator, the steam being discharged from said chamber by a suitable pipe D'.

E is a manifold suitably supported in the lower part of chamber A and provided with a series of concentrically-arranged pipes F, secured at their lower open ends in the top plate of the manifold. These pipes pass axially through the tubes C C and extend for some distance above the upper partition B, their upper ends being closed.

e e are short tubes open at each end, secured between the plates of the manifold.

G G' are respectively the pipes for supplying steam to and discharging it from the manifold.

H is the bottom plate to chamber A, provided with a series of concentric rows of perforations h h (three are shown) and with a central hub or pivot h'.

I J K are rings or annuli, each provided with a concentric row of perforations corresponding to the row of holes in the base-plate, over which it is placed.

i j k are operating-handles secured, respectively, to the annular plates I J K and extending outward through slots in the wall of chamber.

L is the discharge-pipe for the heating-chamber.

The operation of the invention is as follows: Wheat falls from the pipe a upon the upper cup-shaped partition B and passes down through the tubes C C and small tubes e e into the bottom of the heating-chamber. As the tubes F F extend up into the top of the heating-chamber, the wheat, as soon as it falls from the pipe, is subjected to the action of heat, and this action is continued until it reaches the bottom and while it is retained thereon. The arrows within the chamber in Fig. 1 show the manner in which the wheat passes through the apparatus. By the employment of the annular plates I J K the passage of heated wheat from the apparatus can be regulated, as desired. It will be seen that the wheat is subjected to the action of heat from the time it enters the chamber until it is discharged therefrom, and that it is scattered over a large heating-surface during its passage therethrough, so that there is no liability of any of the kernels emerging from the apparatus in a cold state.

It is of course obvious that the apparatus can be employed to heat other cereals, if desired, and that many modifications could be made in the structure without departing from my invention.

Having thus described my invention, what I claim, and desire to secure by Letters Patent, is—

1. The combination, with the heating-chamber and its series of heating-pipes, of a supply-manifold for said pipes, provided with a series of open-ended tubes through which the cereals pass, substantially as and for the purpose specified.

2. The combination, with the heating-chamber, of partitions secured near the top and bottom thereof, a series of open-ended tubes connecting said partitions, a manifold supported in the chamber below the lower partition, and a series of pipes closed at their upper ends passing from the manifold through the tubes and into the top of the heating-chamber, substantially as and for the purpose specified.

3. In an apparatus for heating wheat, the combination of a heating-chamber, partitions riveted to the inner wall thereof, a series of tubes secured at their open ends to said partitions, a manifold supported in the chamber below the lower partition and containing a series of short open-ended tubes, and a series of pipes secured to the top plate of the manifold, passing through the first-named tubes, and entering the top of the heating-chamber, substantially as and for the purpose specified.

In testimony whereof I affix my signature in presence of two witnesses.

AUGUSTUS H. BROCKMAN.

Witnesses:
WM. H. BLODGETT,
FRANK D. MERCHANT.